United States Patent [19]

Rey-Bellet et al.

[11] 3,860,615

[45] Jan. 14, 1975

[54] TRICYCLIC COMPOUNDS AND PROCESSES

[75] Inventors: Gerald Rey-Bellet; Hans Spiegelberg, both of Basle, Switzerland

[73] Assignee: Hoffmann-La Roche Inc., Nutley, N.J.

[22] Filed: Jan. 10, 1973

[21] Appl. No.: 322,600

Related U.S. Application Data

[60] Division of Ser. No. 164,107, July 19, 1971, Pat. No. 3,726,870, which is a division of Ser. No. 759,499, Sept. 12, 1968, Pat. No. 3,631,103, which is a continuation-in-part of Ser. No. 431,981, Feb. 11, 1965, abandoned.

[30] Foreign Application Priority Data

Feb. 18, 1964 Switzerland.......................... 1969/64
Dec. 4, 1964 Switzerland....................... 15709/64

[52] U.S. Cl..... 260/340.9, 260/247.1, 260/247.5 B, 260/247.7 A, 260/247.7 F, 260/268 PC, 260/293.56, 260/326.81, 260/338, 260/340.7, 260/465 R, 260/465 G, 260/515 R, 260/515 A, 260/516, 260/520, 260/558 H, 260/558 S, 260/559 H, 260/559 S, 424/278

[51] Int. Cl............................................ C07d 13/04

[58] Field of Search............... 260/338, 340.7, 340.9

[56] References Cited
UNITED STATES PATENTS 3,586,718   6/1971   Edenhofer et al. .............. 260/340.9

*Primary Examiner*—Donald G. Daus
*Assistant Examiner*—James H. Turnipseed
*Attorney, Agent, or Firm*—Samuel L. Welt; Bernard S. Leon; William G. Isgro

[57] ABSTRACT

Dibenzo[a,d]cyclohepta[1,4,6]trienes bearing in the 5-position, substituents such as, for example, oxo- or 3'-lower alkoxyalkylidene and in the 10-position, substituents such as, for example, carbonyl, thiocarbonyl or guanyl radicals, for instance, 5-(3'-lower alkoxypropylidene)-dibenzo[a,d]cyclohepta [1,4,6]triene 10-carboxylic acid di-(lower alkyl)amides and dibenzo[a-,d]cyclohepta[1,4,6]trien-5-one 10-carboxylic acid cyclic amides, prepared, inter alia, from 5-(3'-lower alkoxypropylidene)-dibenzo[a,d]cyclohepta,[1,4,6]-triene 10-carboxylic acid, 10-halocarbonyl-5-(3'-lower alkoxypropylidene)dibenzo[a,d]cyclohepta[1,4,6]-triene or dibenzo[a,d]cyclohepta[1,4,6]trien-5-one 10-carboxylic acid halide, are described. The end products are useful as antidepressants.

2 Claims, No Drawings

TRICYCLIC COMPOUNDS AND PROCESSES

This is a division, of application Ser. No. 164,107 filed July 19, 1971, now U.S. Pat. No. 3,726,870, patented Apr. 10, 1973, which in turn is a division of application Ser. No. 759,499, filed Sept. 12, 1968, now U.S. Pat. No. 3,631,103, patented Dec. 28, 1971, which in turn is a continuation-in-part of application Ser. No. 431,981, filed Feb. 11, 1965, now abandoned.

BRIEF SUMMARY OF THE INVENTION

The invention relates to compounds of the formula

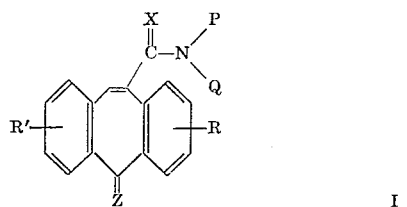

I

Wherein R and R' are each independently selected from the group consisting of hydrogen, halogen, lower alkyl, lower alkoxy; P and Q are each independently selected from the group consisting of hydrogen, lower alkyl, benzyl, β-picolyl, di-lower alkylamino, lower alkylamino-lower alkyl and amino-lower alkyl; P and Q, when taken together with the N atom are selected from the group consisting of piperidino, lower alkylpiperidino, piperazino, pyrrolidino, morpholino, $N^4$-hydroxy-lower alkyl-piperazino and 4'-(4''-chlorobenzyl)piperazino; Z is selected from the group consisting of oxo and =CH—A—B wherein A is lower alkylene and B is selected from the group consisting of halogen, lower alkoxy and lower alkylthio; and X is oxygen, sulfur or imido.

In another aspect, the invention relates to compounds of Formula I wherein Z is oxo ketalized with lower alkanol, lower alkylenediol or lower alkylidene.

In still another aspect, the invention relates to compounds of the formulae

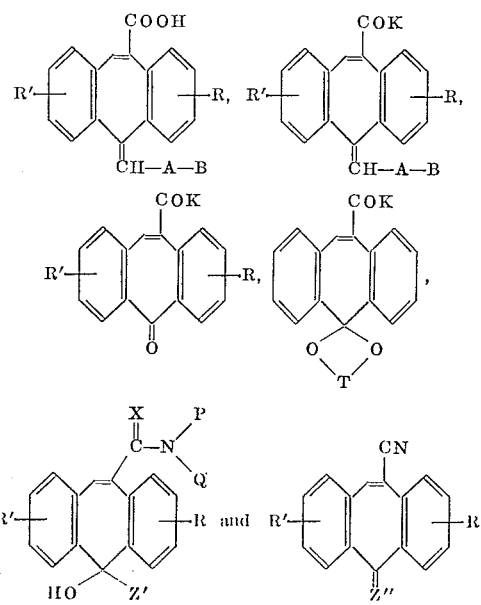

wherein R and R' are each independently selected from the group consisting of hydrogen, halogen, lower alkyl and lower alkoxy; A is lower alkylene; B is selected from the group consisting of halogen, lower alkoxy, lower alkylthio; K is selected from the group consisting of bromine, chlorine, lower alkoxy and lower alkanoyloxy; P and Q are each independently selected from the group consisting of hydrogen, lower alkyl, benzyl, β-picolyl, di-lower alkylamino, lower alkylamino-lower alkyl and amino-lower alkyl; P and Q, when taken together with the N atom are selected from the group consisting of piperidino, lower alkylpiperidino, piperazino, pyrrolidino, morpholino, $N^4$-hydroxy-lower alkyl-piperazino and 4'-(4''-chlorobenzyl)piperazino; Z' is selected from the group consisting of lower alkyl and —CH₂—A—B wherein A and B are as previously described; Z'' is selected from the group consisting of bis (lower alkoxy), lower alkylenedioxy, lower alkylidene and =CH—A—B wherein A and B are as previously described; and T is lower alkylene.

DETAILED DESCRIPTION OF THE INVENTION

The present invention relates to antidepressant tricyclic compounds, intermediates useful in their preparation and methods for the preparation thereof. More particularly, the antidepressant compounds of this invention are of the formula

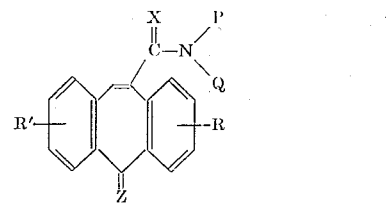

I wherein R and R' are each independently selected from the group consisting of hydrogen, halogen, lower alkyl of 1–4 carbon atoms, lower alkoxy of 1–4 carbon atoms; P and Q are each independently selected from the group consisting of hydrogen, lower alkyl of 1–4 carbon atoms, benzyl, β-picolyl, di-lower alkylamino of 1–4 carbon atoms, lower alkylamino-lower alkyl of 1–4 carbon atoms and amino-lower alkyl of 1–4 carbon atoms; P and Q, when taken together with the N atom are selected from the group consisting of piperidino, lower alkylpiperidino of 1–4 carbon atoms, piperazino, pyrrolidino, morpholino, $N^4$-hydroxy-lower alkyl-piperazino of 1–4 carbon atoms and 4'-(4''-chlorobenzyl)piperazino; X is oxygen, sulfur or imido; and Z is selected from the group consisting of oxo and =CH—A—B wherein A is an alkylene of 1–4 carbon atoms and B is selected from the group consisting of halogen, lower alkoxy of 1–4 carbon atoms and lower alkylthio of 1–4 carbon atoms.

In another aspect, the invention relates to compounds of Formula I wherein Z is oxo ketalized with lower alkanol, lower alkylenedioxy or lower alkylidene.

Preferred compounds of Formula I are those wherein $R^1$ and R are hydrogen or halogen, P and Q are lower alkyl and when taken together with the N atom are morpholino; X is oxo and Z is oxo or =CH—A—B wherein A is ethylene and B is lower alkoxy.

Most preferred compounds of Formula I are: 5-(3'-methoxypropylidene)-dibenzo[a,d]cyclohepta[1,4,6]-triene 10-carboxylic acid dimethylamide, and 10-(morpholinocarbonyl)-5H-dibenzo[a,d]cyclohepta[1,4,6]trien-5-one.

As indicated, the

in Formula I can represent either a free amino group or a mono or di-substituted amino group. For example, it can represent a lower alkylamino group (especially the methyl, ethyl, propyl, isopropyl or butylamino group) or an ar-alkylamino group such as a phenyl-lower alkylamino group (especially benzylamino). Also, it represents a lower alkylamino group wherein the lower alkyl part is further substituted by an amino group (i.e., amino, lower alkylamino or di-lower alkylamino) or a heterocyclic moiety, e.g., pyridyl. Such substituted lower alkylamino groups are, for example, dimethylaminoethylamino and pyridylmethylamino. Moreover, it can also represent a di-lower alkyl-amino group, the alkyl moieties of which each preferably contain 1–4 carbon atoms (for example, the dimethylamino group, the diethylamino group or the methylethylamino group), a lower alkyl-aralkyl-amino group (for example, an N-lower alkyl-N-(phenyl-lower alkyl)-amino group such as the methyl-benzylamino group) or a di(aralky)amino group such as a di-(phenyl-lower alkyl)-amino group (for example, the dibenzylamino group). The lower alkyl moieties of these disubstituted amino groups can also be substituted by an amino group or a heterocyclic moiety, as indicated above with respect to the lower alkyl part of the lower alkylamino group. The

in Formula I, when P and Q are taken together, represents a substituted or unsubstituted 5- or 6-membered heterocyclic moiety which is linked through a nitrogen atom and may contain one other hetero atom. Examples of such heterocyclic moieties are piperidino, piperazino, pyrrolidino and morpholino, as well as the corresponding lower alkyl substituted heterocyclic moieties, for example, methyl piperidino. Other substituted heterocyclic moieties are also comprehended, for example N-hydroxy-lower alkyl-piperazino (for example, N-hydroxyethyl-piperazino).

The aromatic rings of the compounds of Formula I can be unsubstituted, i.e., where R and R' are both hydrogen, or can be substituted. The substituents represented by R and R' are, for example, halogen (especially chlorine or bromine), lower alkyl of 1–4 carbon atoms (especially methyl or ethyl), lower alkoxy of 1–4 carbon atoms (especially methoxy or ethoxy).

In the meaning of Z as =CH—A—B, the symbol A, as indicated, represents an alkylene residue of 1–4 carbon atoms. It preferably represents a straight chain or branched chain alkylene residue separating the moiety denoted by B from the pictured carbon atom by one or especially preferred, two carbon atoms. The symbol B denotes halogen (preferably chlorine or bromine), lower alkoxy of 1–4 carbon atoms (such as methoxy or ethoxy) or lower alkylthio of 1–4 carbon atoms (such as methylthio or ethylthio). In its other meaning, Z can be oxo. It can also be ketalized oxo wherein the ketalization is effected with either a lower alkylene glycol, in which case Z represents a lower alkylenedioxy moiety; or with a lower alkanol, in which case Z represents, together with the 5-position carbon atom, a moiety of the formula:

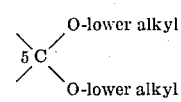

As indicated, there may be used as ketal-forming substances, lower alkanols and lower alkylene glycols, for example, methanol, ethanol or ethylene glycol. In addition to the foregoing, Z can also represent a lower alkylidene moiety, for example, methylidene or ethylidene.

The basic compounds of formula I above form acid addition salts. Such basic compounds are, for example, those of formula I wherein

represents a basically substituted amino group. For example, the basic compounds of formula I form pharmaceutically acceptable acid addition salts with both organic and inorganic pharmaceutically acceptable acids such as, for example, hydrobromic acid, hydrochloric acid, nitric acid, sulfuric acid, phosphoric acid, hydrochloric acid, nitric acid, sulfuric acid, phosphoric acid, acetic acid, formic acid, oxalic acid, succinic acid, citric acid, methanesulfonic acid, p-toluene sulfonic acid, and the like. Acid addition salts of compounds of formula I which pharmaceutically non-acceptable acids can be converted into free bases simply by neutralization, or can be converted into pharmaceutically acceptable acid addition salts by either neutralization followed by reaction with a pharmaceutically acceptable acid or by a simple exchange reaction with a pharmaceutically acceptable acid.

The compounds of formula I above can be prepared from an acid of the formula:

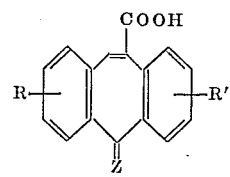

III wherein R, R', and Z have the same meaning as above or a reactive functional derivative thereof, via reaction with ammonia or a substituted amine, i.e. a compound of the formula:

wherein P and Q have the same meaning as above.

In another embodiment, compounds of formula I can be prepared from compounds of the formula:

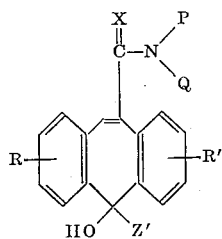

wherein R, R', P and Q have the same meaning as above, and Z' is selected from the group consisting of lower alkyl and —CH$_2$—A—B wherein A and B have the same meaning as above, via dehydration to yield a compound of formula I.

In those compounds of formula I obtained via the conversion of an intermediate of formula III or formula V wherein B represents halogen, the so-obtained halides can be further transformed within the definition given for B, i.e. to ethers or thioethers. Moreover, the so-obtained amides of formula I (i.e. X=O) can be converted to thioamides (i.e. X=S). Also, the so-obtained compounds of formula I wherein Z is oxo can be ketalized or reacted with a lower alkyl magnesium halide, the so-obtained organo-metallic compound hydrolyzed yielding a carbinol (for example, of formula V) which can then be dehydrated to yield a compound of formula I containing a semicyclic double bond in the 5-position. In another variant, compounds of formula I wherein Z is a ketalized oxo group can be hydrolyzed to yield corresponding compounds of formula I where Z is oxo.

The starting material compounds of formula III can be prepared in various ways, starting from ketones of the formula:

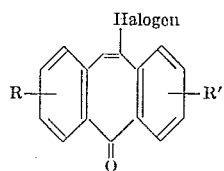

wherein R and R' have the same meaning as above. For example, compounds of formula III above wherein Z is =CH—A—O—lower alkyl, can be prepared from compounds of formula VI via ether derivatives of the formula:

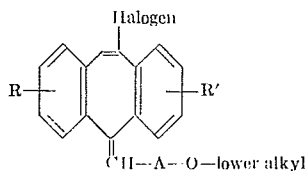

wherein R and R' have the same meaning as above.

Several additional processes utilizing the ketone of Formula VI as starting material are discussed hereinafter:

a. A ketone of formula VI can be reacted with a propenyl halide by means of a metal-organic reaction. This reaction can be effected, for example, by a lithium, zinc or, preferably, by a magnesium organo-metallic compound. The reaction product is then subjected to hydrolysis, preferably under conditions practically neutral, i.e. neither strongly basic nor strongly acidic, e.g. by treatment with ammonium chloride. After the hydrolysis the elements of a hydrogen halide can be added to the terminally unsaturated propenyl residue. For example, this reaction can be carried out in an advantageous manner by treating the tricyclic reaction product bearing a terminally unsaturated alkenyl residue with hydrogen bromide, conveniently with a solution of hydrogen bromide in glacial acetic acid or chloroform at room temperature. The so-obtained 5ω-halopropylidene derivatives are for the most part viscous, difficultly crystallizable substances which can be distilled undecomposed in a high vacuum. The exchange of the ω-halogen atom for a lower alkoxy group can be effected, for example, via treatment with an alkali metal alcoholate. An alkali metal compound of a lower alkanol (e.g. sodium methylate or sodium ethylate) is especially advantageous for this purpose. The exchange reaction is conveniently effected at the boil in the presence of an excess of the alkanol corresponding to the alcoholate used. b. A ketone of formula VI can be reacted with a cyclopropyl halide by means of a metal organic reaction and the reaction product can then be treated with a halogenating agent according to the conditions mentioned in process variant a. above to yield the omega-halopropylidene-substituted compounds which can then be further reacted as described under a.

c. A ketone of formula VI can be reacted directly with a lower alkoxypropyl halide. This reaction is preferably carried out via a magnesium compound according to the conditions given under a. above. Examples of such lower alkoxypropyl halides are, for example, 1-chloro-2-methyl-3-methoxypropane, 1-chloro-3-methoxypropane, and the like. The lower alkoxy group is advantageously one such as methoxy, ethoxy, propoxy, butoxy or the like and is advantageously at the end position (omega position) of the alkyl halide. Thus, ω-methoxypropyl magnesium compounds are preferred starting materials. Besides lower alkoxy, the ether function can also be, for example, ar-alkoxy (for example, phenyl-lower alkoxy such as benzyloxy or phenethyloxy) or also tetrahydropyranyloxy. The reaction products are hydrolyzed as described under a. above and can then be subsequently dehydrated. According to a modification of the procedure, there can be used as a starting material a ketone of formula VI containing no halogen substituent in the 10-position. After the introduction of the alkoxypropylidene residue in the 5-position, a halide substituent can then be introduced into the 10-position by treatment with a halogenating agent and subsequent splitting out of the elements of hydrogen halide. For the introduction of this halogen substituent, the 5-alkoxypropylidene derivative in conveniently treated in an inert solvent such as halogenated hydrocarbon (e.g. carbon tetrachloride) with a halogen (e.g. chlorine or bromine). This treatment with halogen is preferably carried out in the presence of a catalyst. This halogenation yields 10,11-dihalo compounds which can be converted into ether derivatives of formula VII via the splitting out of the elements of hydrogen halide. The splitting out can be effected, for example, by means of an alkali carbonate or alkali hydroxide.

d. A ketone of formula VI can be reacted with an alkali metal compound of the formula:

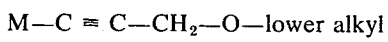

M—C ≡ C—CH$_2$—O—lower alkyl

VIII wherein M is an alkali metal.

The so-obtained compound can then be hydrolyzed to yield a compound of the formula:

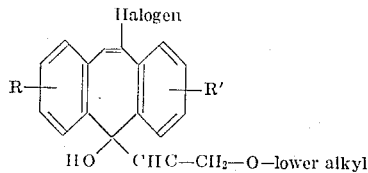

IX wherein R and R' have the same meaning as above.

The reaction of the ketone of formula VI with a propinyl compound of formula VIII is preferably carried out utilizing a compound of formula VIII wherein M is sodium, potassium or lithium. The tricyclic ketone of formula VI can be added either in solid or finely powdered form or in an inert solvent such as, for example, absolute ether, benzene or tetrahydrofuran, to the alkali metal organic compound of formula VIII, the latter being suspended in liquid ammonia. The decomposition of the resultant metal organic compound is advantageously effected under practically neutral conditions (e.g. ammonium chloride or an aqueous ammonium chloride solution). The products so-obtained are subsequently saturated (hydrogenated) at the side chain triple bond and then dehydrated. The hydrogenation is conveniently effected in the presence of a noble metal catalyst (e.g. platinum oxide) under normal conditions. After the theoretical amount of hydrogen to saturate the triple bond has been absorbed, the hydrogenation is advantageously immediately stopped.

e. A tricyclic ketone of formula VI can be reacted with a lower alkyl magnesium halide. The carbinol, i.e. the 5-hydroxy-5-alkyl derivative, formed after hydrolysis of the metal-organic reaction product, can then be converted by dehydration into the corresponding 5-lower alkylidene compound with a semicyclic double bond. The so-obtained intermediates containing the 5-lower alkylidene substituent, can then be converted into 10-carboxy compounds or, alternatively, can be treated with a halogenating agent, for example a compound containing a 5-ethylidene substituent can be halogenated to a corresponding compound containing a β-haloethylidene substituent. The β-haloethylidene moiety can, in turn, be converted into a β-lower alkoxy ethylidene moiety according to the conditions given under a.

f. A ketone of formula VI can be converted into a corresponding compound containing a ketalized oxo group in the 5-position via conventional ketalization means, i.e. by treatment with a lower alkylene glycol such as ethylene glycol or by treatment with a lower alkanol such as methanol or ethanol.

Compounds of formula III containing a 10-carboxy group can be obtained from the corresponding 10-halo compounds obtained as described above (e.g. in process variants a.-f.) by exchange of the halogen atom in the 10-position for a carboxy group which may be functionally modified.

Compounds of formula III can thus be obtained from corresponding 10-halo compounds via several different methods. In one method, the corresponding 10-halo compound can be treated in an inert solvent (e.g. tetrahydrofuran) with magnesium and the so-obtained magnesium-organic compound reacted with carbonic acid. Hydrolysis then yields a 10-carboxylic acid of formula III which, if desired, can be converted in a manner known per se into its functional derivatives such as esters (especially with lower alkanols), carbonyl halides (especially chlorides and bromides), or anhydrides. To obtain compounds of formula III wherein Z is oxo, it is suitable to protect the 5-oxo group of the 10-halo starting material prior to the treatment with magnesium. This protection is suitably effected via ketalization, for example, with ethylene glycol. After the treatment with carbonic acid, the ketal group can be hydrolyzed to regenerate the 5-oxo group or alternatively, the ketal group can be regenerated after subsequent reaction steps.

Compounds of formula III can also be obtained from corresponding 10-halo compounds via treatment of the latter with a metal cyanide (e.g. sodium cyanide, potassium cyanide or copper cyanide) in an inert solvent whereby there is obtained a compound corresponding to those of formula III which, instead of the 10-carboxy group pictured in formula III, carries a 10-cyano substituent. Via saponification of the cyano group, the desired 10-carboxy compound of formula III can be obtained. Functional derivatives of the 10-carboxy substituent can be prepared according to known methods as indicated above. Prior to the treatment with the metal cyanide, it is suitable to protect a 5-oxo group via ketalization, if the starting material used contains such.

Starting materials of formula III in which Z is =CH—A—B and B is halogen, can be prepared, for example, from the corresponding alkoxy substituted compounds, by treatment with hydrogen halide or especially by treatment with boron trihalide. In one convenient method, the alkoxy substituted alkylidene compound of formula III is treated with a 2-molar quantity of baron trihalide in the presence of an inert solvent, e.g. methylene chloride, at a low temperature, for example, at about −10°C.

Starting materials of formula V which, as indicated above, can be converted via dehydration to the desired end products of formula I, can themselves be obtained from the ketones of formula VI. Thus, the halo substituent in the 10-position of the ketone of formula VI can be replaced by the cyano group by treatment with a metal cyanide (especially preferred is a copper cyanide). After saponification of the cyano group and reaction of the so-formed free carboxylic acid or one of its functional derivatives with an amine, there are obtained compounds of fomrula I wherein Z is oxo, i.e. 10-carbamoyldibenzo[a,d]cyclohepta[1,4,6]trien-5-ones. These latter 5-oxo compounds can be converted into compounds of formula V; for example, via reaction with an alkali metal compound of formula VIII, subsequent hydrolysis and hydrogenation according to the conditions mentioned under d.

The manifold possibilities for the production of the starting materials discussed in the foregoing paragraphs are only exemplary. Numerous other process variants are available and will be apparent to those skilled in the art.

The compounds of formula III can be reacted directly with ammonia or the substituted amines of formula IV in the form of the free acid or alternatively, as a functional derivative. When the free acid of formula III is used, the reaction is conveniently carried out in the presence of a condensing agent, e.g. an N,N'-disubstituted carbodiimide. Reactive acid derivatives which can be used are, for example, lower alkyl esters, carbonyl halides (especially chlorides or bromides), nitriles and anhydrides of the 10-carboxy acids of formula III. When nitriles are used, amidine derivatives are obtained (for example by treatment of the nitrile with an amine magnesium halide in an inert organic solvent such as ether or tetrahydrofuran a guanyl (X-imido) compound of formula I is obtained. It should be noted that, if a nitrile starting material containing an oxo group is used, the 5-oxo group should be protected by ketalization prior to the treatment with the amine-magnesium halide. For reaction with the free acid of formula III or the lower alkyl ester, carbonyl halide or anhydride functional derivatives thereof, there is suitably used a compound of formula IV, for example, ammonia, a lower alkyl amine (e.g. methylamine), a di-lower alkyl amine (e.g. dimethylamine) or a heterocyclic amine such as piperidine, morpholine, N-hydroxyethyl-piperazine, or the like. Especially preferred are the di-lower alkylamines, such as dimethylamine.

When the reaction is effected with a carbonyl chloride corresponding to formula III (which acid chlorides are accessible from the free acids of formula III, for example, by treatment of the latter with thionyl chloride with heating), the amidation is conveniently effected at a very low temperature, for example from about 0°C. to about 30°C. Esters which can be obtained from the free acids in a manner known per se are advantageously reacted with the desired amine at an elevated temperature, under elevated pressure if necessary.

Compounds of formula V can be dehydrated as indicated above. This dehydration is advantageously effected by heating the compound of formula V with a lower alkanolic hydrochloric acid. However, it is also possible to dehydrate with other dehydration agents such as, for example, phosphorus oxychloride, p-toluene-sulfonyl chloride, sulfuric acid, zinc chloride, potassium bisulfate, or the like, in an inert organic solvent (such as, for example, chloroform or methylene chloride).

As indicated above, in those products of formula I obtained via amidation or dehydration wherein the symbol Z is =CH—A—B, the substituent represented by B can itself be further transformed in reaction steps subsequent to the amidation or dehydration. For example, compounds of formula I in which said substituent B represents a halogen atom can be reacted with a metal alcoholate or metal mercaptan, preferably an alkali metal lower alcoholate or an alkali metal lower alkyl mercaptan, conveniently in the presence of the lower alcohol corresponding to the alcoholate or mercaptan used. Suitably, the metal compound is added suspended in an inert solvent. Compounds of formula I wherein B is lower alkoxy or lower alkylthio are thus obtained.

Moreover, carboxylic acid amides of formula I can be converted to corresponding thioamides of formula I by treatment with phosphorus-sulphur compounds (e.g. phosphorus pentasulfide), preferably in a neutral, anhydrous solvent to diluent at a temperature from about 50°C. to about 120°C.

Compounds of formula I wherein Z represents a ketal group can be converted to corresponding ketones, i.e. wherein Z is oxo, via warming with dilute acids (for example, dilute mineral acids). The oxo group in ketones of formula I can themselves be transformed into lower alkylidene moieties, for example by reaction of the ketone with an alkyl magnesium halide. This latter conversion is only possible if the

amino group and the imido group X are resistent to the Grignard reagent used.

The compounds of formula I can occur in various isomeric forms. Mixtures of different isomers can be separated into the separate cis and trans antipodes according to methods known per se; for example, by fractional crystallization on the basis of different solubility of the individual isomers or derivatives thereof. Separation of the geometrical isomers can be effected with the starting materials or at the intermediate stages. Subsequent reaction then yields pure isomers and, in this instance, the end products of formula I are obtained in the form of a pure geometric isomer.

The compounds of formula I, as well as their pharmaceutically acceptable acid addition salts are characterized by their antidepressant action on the central nervous system and are useful as antidepressants. They are especially useful as antidepressants in that they give rise to only a very slight anti-cholinergic effect. These compounds are useful not only in relief of symptomatology associated with depression of the central nervous sytem, but are also useful in the prevention and reversal of central nervous system depression caused by exogenous chemical agents. An especially advantageous subclass of compounds of formula I are those wherein R and R' are both hydrogen.

The compounds of formula I as well as their pharmaceutically acceptable acid addition salts, can be administered internally for example, enterally (e.g. orally) or parenterally, with dosage adjusted to individual requirements. They can be administered in the form of conventional pharmaceutical preparations containing conventional organic or inorganic pharmaceutical solid or liquid carrier materials suitable for enteral, e.g. oral, or parenteral administration. For example, the pharmaceutically active ingredient of formula I or a pharmaceutically acceptable acid addition salt thereof can be compounded according to conventional methods with conventional pharmaceutical carriers which do not react with the active ingredient, such as water, gelatin, lactose, starches, magnesium stearate, talc, vegetable oils, gums, polyalkylene glycols, petroleum jelly and the like. The pharmaceutical preparations can be in solid form, for example, tablets, dragees, suppositories or capsules, or in liquid form, for example, solutions, emulsions or suspensions. If desired, they can be submitted to pharmaceutical expedients such as sterilization or can contain conventional excipients such as preservatives, stabilizing agents, wetting or emulsifying agents, salts for the adjustment of osmotic pressure, or buffers, and they also can contain, in combination, other therapeutically active substances.

The useful psychopharmacological antidepressant activity of the compounds of Formula I is demonstrated in warm-blooded animals utilizing standard procedures. For example, groups comprising 10 mice each are administered the test substance in variable amounts subcutaneously. After 16 hours, they are given subcutaneously 5 mg/kg. of 2-hydroxy-2-ethyl-3-isobutyl-9,10-dimethoxy-1,2,3,4,-6,7-hexahydro-11bH-benzyl-[a]quinolizine (substance A), and 30 minutes thereafter, they are given intraperitoneally 4.00 mg/kg. of ethanol. A control group of 10 animals is given only ethanol. The duration of sleep is measured in all animals. The percentage decrease in duration in sleep in comparison with the duration of the substance A potentiated sleep reflects the psychopharmacological antidepressant effect.

When 5-(3'-methoxy-propylidene)dibenzo[a,d]cyclohepta[1,4,6]triene-10-carboxylic acid dimethylamide, which has an $LD_{50}$ of 2000 mg/kg. p.o., is utilized as the test substance at a dosage of 20 mg/kg. s.c., a corresponding 54 percent decrease in duration of sleep is produced, and at a dosage of 10 mg/kg. s.c., a corresponding 45 percent decrease in duration of sleep is produced.

When 10-morpholinocarbonyl-dibenzo[a,d]cyclohepta[1,4,6]trien-5-one, which has an $LD_{50}$ of 3500 mg/kg. p.o., is utilized as the test substance at a dosage of 20 mg/kg. s.c., a corresponding 56 percent decrease in duration of sleep is produced.

The following examples are illustrative but not limitative of the invention. All temperatures are stated in degrees Centigrade.

EXAMPLE 1

A solution of 12.6 g. of 10-chlorocarbonyl-dibenzo[a,d]cyclohepta[1,4,6]trien-5-one in 50 ml. of dry benzene is added dropwise with stirring to a solution of 10 g. of dimethylamine in 100 ml. of dry benzene. During the addition, the temperature of the reaction mixture is maintained at 20°–25° via external cooling. After the addition, the reaction mixture is stirred 30 minutes and is then heated under reflux for still a further 30 minutes. The benzene and excess dimethylamine is then distilled off under reduced pressure. The residue is taken up in benzene and the resultant solution washed with water, dilute hydrochloric acid, water, sodium bicarbonate solution and then once again with water. The solution is then dried and concentrated yielding as the residue, dibenzo-[a,d]cyclohepta[1,4,6]trien-5-one 10-carboxylic acid dimethylamide which, after recrystallization from high boiling petroleum ether, melts at 146°–147°.

The 10-chlorocarbonyl-dibenzo[a,d]cyclohepta[1,4,6]trien-5-one used as the starting compound can be prepared as follows:

In a 500 ml. round bottom flask equipped with a stirrer, reflux condenser and gas inlet tube, 50 g. of 10-bromo-dibenzo[a,d]cyclohepta[1,4,6]trien-5-one is dissolved in 150 ml. of ethylene glycol. The solution is then saturated with hydrogen chloride gas. During the addition of the gas, the solution is strongly agitated and the temperature rises to 85°. After the addition, the reaction mixture is stirred for one hour at 100° (bath temperature), then cooled and poured into excess ice cold caustic soda. The reaction mixture is then filtered with suction and recrystallized from high boiling petroleum ether to yield 10-bromo-5,5-ethylenedioxy-dibenzo[a,d]cyclohepta[1,4,6]triene melting at 171°–172°.

In a one liter 3-necked flask, equipped with a stirrer, a dropping funnel and a reflux condenser, a few drops of methyl iodide are added to 9 g. of magnesium shavings. As soon as the reaction has started, a solution of 78.6 g. of 10-bromo-5,5-ethylenedioxy-dibenzo[a,d]cyclohepta[1,4,6]triene in 450 ml. of dry, peroxide-free tetrahydrofuran is added dropwise in such a manner that the reaction mixture is maintained at a temperature between 40° and 42°. After the addition is completed, the reaction mixture is heated for a further 3 hours under reflux conditions and during this heating the magnesium nearly completely disappears. After the heating, a stream of dry carbon dioxide gas is introduced at −40° into the resultant yellow brown solution. After two hours, the reaction terminates. The reaction mixture is then decomposed via the addition of a saturated ammonium chloride solution. The tetrahydrofuran is then evaporated off under reduced pressure and the residue dissolved with methylene chloride and the resultant solution extracted with dilute sodium carbonate solution. The alkaline solution is then esterified with hydrochloric acid yielding, as a precipitate, 10-carboxy-5,5-ethylenedioxy-dibenzo[a,d]cyclohepta[1,4,6]triene which, after recrystallization from ethyl acetate/petroleum ether, melts at 276°–278°. 50 g. of 10-carboxy-5,5-ethylenedioxy-dibenzo[a,d]cyclohepta[1,4,6]triene, 50 ml. of concentrated hydrochloric acid and 500 ml. of acetone are heated together for one hour under reflux conditions. The solvents are then evaporated off and the residue dissolved in aqueous sodium bicarbonate. The so-obtained solution is then filtered over charcoal and esterified with hydrochloric acid. The precipitated reaction product is then taken up in methylene chloride solution, dried and concentrated. The so-obtained residual 10-carboxy-dibenzo[a,d]cyclohepta[1,4,6]trien-5-one, after recrystallization from ethyl acetate/petroleum ether, melts at 202°–204°.

12.5 g. of 10-carboxy-dibenzo[a,d]cyclohepta[1,4,6]trien-5-one and 40 ml. of thionyl chloride are heated together for one hour under reflux conditions. The excess thionyl chloride is then distilled off under reduced pressure, yielding as the residue, crude solid 10-chlorocarbonyl-dibenzo[a,d]cyclohepta[1,4,6]trien-5-one.

EXAMPLE 2

9 g. of 10-carboxy-5,5-ethylenedioxy-dibenzo[a,d]cyclohepta[1,4,6]triene and 100 ml. of thionyl chloride are heated under reflux conditions for one hour.

The excess thionyl chloride is then distilled off under reduced pressure and the residual 10-chlorocarbonyl-5,5-ethylenedioxy-dibenzo-[a,d]cyclohepta[1,4,6]-triene dissolved in 50 ml. of dry benzene. The resultant solution is then added dropwise to a solution of 50 g. of dimethylamine in 300 ml. of dry benzene. During this addition, the temperature of the reaction mixture is maintained at 20°–25° by external cooling. After the addition, the reaction mixture is stirred for 30 minutes at 20° and then heated under reflux conditions for a further 30 minutes. The benzene and the excess dimethylamine are then distilled off under reduced pressure and the residue taken up in benzene. The resultant solution is then washed with water, dilute hydrochloric acid, water, sodium bicarbonate solution and water. It is then dried and concentrated, yielding as the residue, 10-dimethylcarbamoyl-5,5-ethylenedioxy-dibenzo[a,d]-cyclohepta[1,4,6]triene which, after recrystallization from high boiling petroleum ether, melts at 204°–205°.

EXAMPLE 3

25 g. of polyvinylpyrrolidone (K 30) (average molecular weight of about 40000) is dissolved in 120 g. of isopropanol. To this solution there is then added with stirring, a mixture of 100 g. of 10-dimethylcarbamoyl-dibenzo[a,d]cyclohepta[1,4,6]trien-5-one, 500 g. of lactose and 300 g. of corn starch. The moist mass is then passed through a suitable sieve and dried in a ventilated dryer at about 60°. The dried granulation is then mixed with 25 g. of corn starch, 40 g. of talc and 10 g. of magnesium stearate. From the so-obtained thoroughly intermixed granulation, there are pressed dragees weighing 112 mg. each with an active ingredient content of 10 mg., or weighing 280 mg. each with an active ingredient content of 25 mg. Subsequently, the pressed tablets can be coated with a concentrated sugar syrup according to conventional pharmaceutical methodology.

EXAMPLE 4

3.5 g. 10(11)-Carboxy-3-chlorodibenzo[a,d]cyclohepta[1,4,6]trien-5-one and 30 ml. of thionyl chloride were reacted together for 1 hour at reflux. The excess thionyl chloride was thereafter removed by distillation at reduced pressure. The resulting 10-chloro-carbonyl-3-chloro-dibenzo[a,d]cyclohepta[1,4,6]trien-5-one is dissolved in 20 ml. of dry benzene and added dropwise to a solution containing 20 g. of dimethylamine in 100 ml. of benzene. The reaction temperature is maintained at 20°–25° through outside cooling. The reaction mixture is thereafter heated for another hour at 20° and then the benzene and the excess amine are removed by distillation at reduced pressure. The residue is taken up in benzene. The resulting solution is washed with water, dilute HCl, water, sodium carbonate solution, again with water, dried and evaporated. The resulting 10(11)-dimethylcarbamoyl-3-chloro-dibenzo[a,d]cyclohepta[1,4,6]trien-5-one after recrystallization from benzene/petroleum ether has a melting point of 126°–128°.

The 10(11)-carboxyl-3-chlorodibenzo[a,d]cyclohepta[1,4,6]trien-5-one utilized as a starting material can be prepared, for example, as follows:

64 g. of 3-chloro-dibenzo[a,d]cyclohepta[1,4,6]trien-5-one is dissolved in 550 ml. of chloroform and thereafter treated with 13.88 ml. of bromine. The brown color disappears instantaneously. After reaction is completed, the solution is evaporated under reduced pressure and the residue is dissolved in benzene to yield 3-chloro-10,11-dibromo-dibenzo[a,d]cyclohepta[1,4-]dien-5-one having a melting point of 172°–174°.

76.6 g. of 3-chloro-10,11-dibromo-dibenzo[a,d]cyclohepta[1,4]dien-5-one dissolved in 800 ml. of ethanol and 11.48 g. of potassium hydroxide dissolved in 20 ml. of water are reacted together for 3 hours under reflux. The ethanol is removed by distillation under reduced pressure, and the residue is taken up in chloroform. the chloroform solution is washed neutral with water, dried over sodium sulfate and evaporated. Through fractional crystallization from benzene and then from ethanol, two isomers of 3-chloro-10(11)bromo-dibenzo[a,d]cyclohepta[1,4,6]trien-5-one are obtained, the α-isomer has a melting point of 178°–179° and the β-isomer has a melting point of 129°–132°.

A mixture containing 63 g. of 3-chloro-10(11)bromo-dibenzo[a,d]cyclohepta[1,4,6]trien-5-one, 250 ml. of ethylene glycol and 0.75 g. of p-toluenesulfonic acid are warmed together with vigorous stirring on a water bath at 200°. Then at a pressure of 30 mm/Hg 200 ml. of ethylene glycol are distilled over a 2 ½-hour period.

The cooled residue is treated with 50 ml. of a 12 percent solution of caustic soda and 30 ml. of water. The product is filtered, washed with water and recrystallized from ethanol to yield 10(11)bromo-3-chloro-5,5-ethylenedioxy-dibenzo[a,d]cyclohepta[1,4,6]triene having a melting point of 182°. In a 250 ml. 3-necked flask equipped with a stirrer, dropping device and reflux condenser, 2.25 g. of magnesium chips are treated with 2 drops of methyl iodide and as soon as the reaction starts, a solution containing 21.1 g. of 10(11)bromo-3-chloro-5,5-ethylenedioxydibenzo[a,d]cyclohepta[1,4,6]triene in 125 ml. of peroxide free tetrahydrofuran is added dropwise and the temperature is maintained at 60°. Thereafter, the reaction mixture is reacted for 3 hours under reflux conditions whereby the magnesium chips disappear. Then, the brown solution is treated with a stream of dry carbonic acid at −40°. After 2 hours, the reaction mixture through the addition of dilute hydrochloric acid is decomposed and the tetrahydrofuran is evaporated under reduced pressure. The residue is extracted with ethyl acetate and the solution is taken up with sodium carbonate solution. After acidification of the alkaline solution with hydrochloric acid, the 10(11)carboxy-3-chloro-5,5-ethylenedioxy-dibenzo[a,d]cyclohepta[1,4,6]triene precipitates and after recrystallization from ethanol/water has a melting point of 300°.

4.4 g. of 10(11)carboxy-3-chloro-5,5-ethylenedioxy-dibenzo[a,d]cyclohepta[1,4,6]triene, 200 ml. of acetone and 30 ml. of concentrated hydrochloric acid are heated together for 1 hour under reflux conditions. After removal of the solvent, the residue is dissolved in an aqueous sodium carbonate solution. This solution is filtered and acidified with hydrochloric acid. The precipitated product, 10(11)carboxy-3-chloro-dibenzo[a,d]cyclohepta[1,4,6]trien-5-one, after recrystallization from methanol has a melting point of 207°–209°.

We claim:

1. A compound of the formula

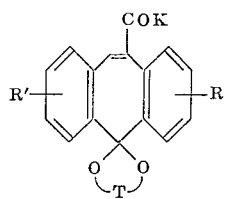
wherein R and R' are each independently selected from the group consisting of hydrogen and halogen; K is hydroxy and T is lower alkylene of 1-4 carbon atoms.
2. The compound in accordance with claim 1, 5,5-ethylenedioxy-dibenzo[a,d]cyclohepta[1,4,6]triene 10-carboxylic acid.
* * * * *